Nov. 28, 1933.  W. H. BASELT  1,936,896
BRAKE RIGGING
Filed Jan. 31, 1930   3 Sheets-Sheet 1
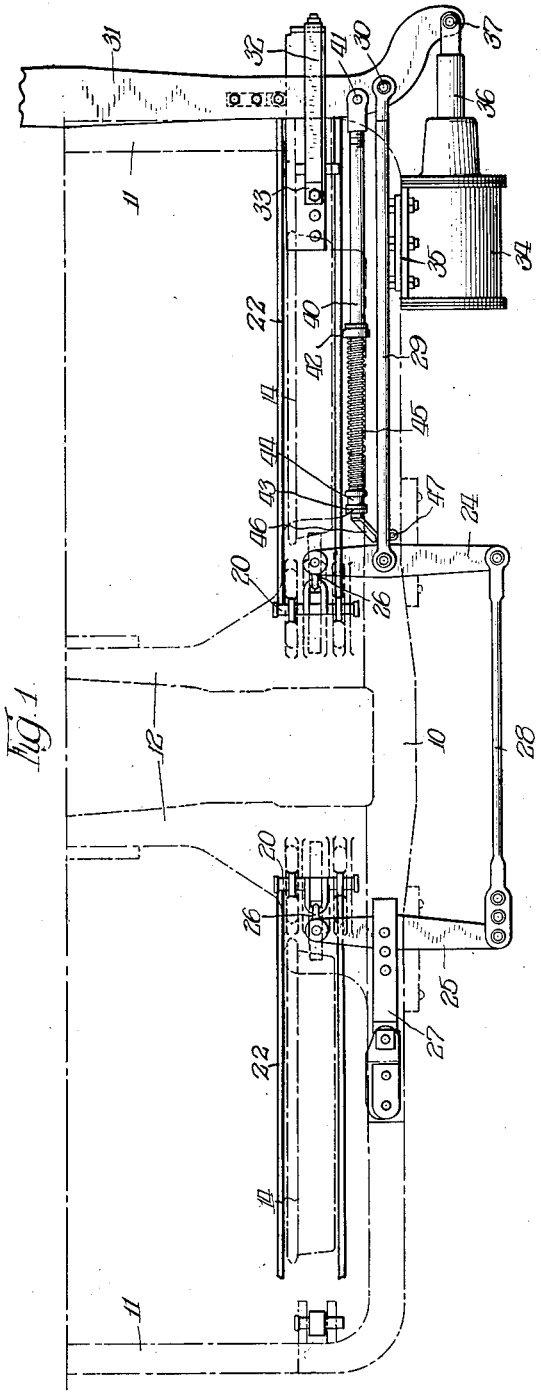
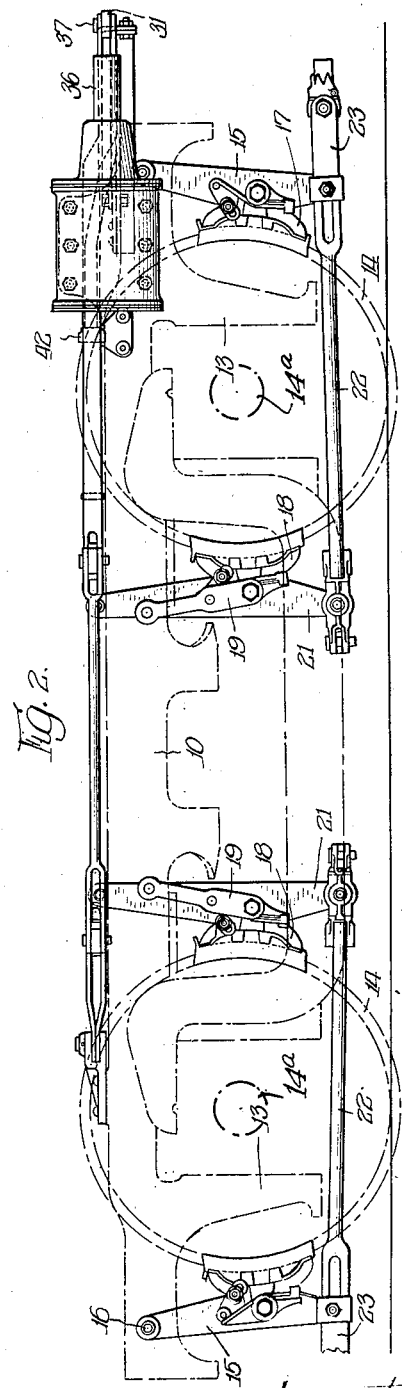
Inventor:
Walter H. Baselt,
By Wilkinson, Huxley, Byron & Knight
Attys

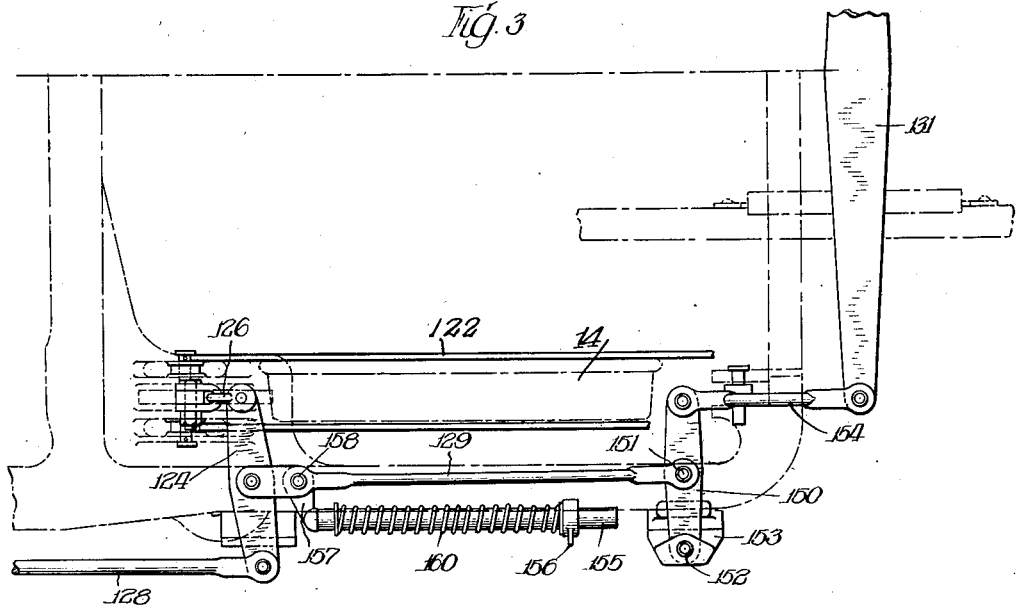
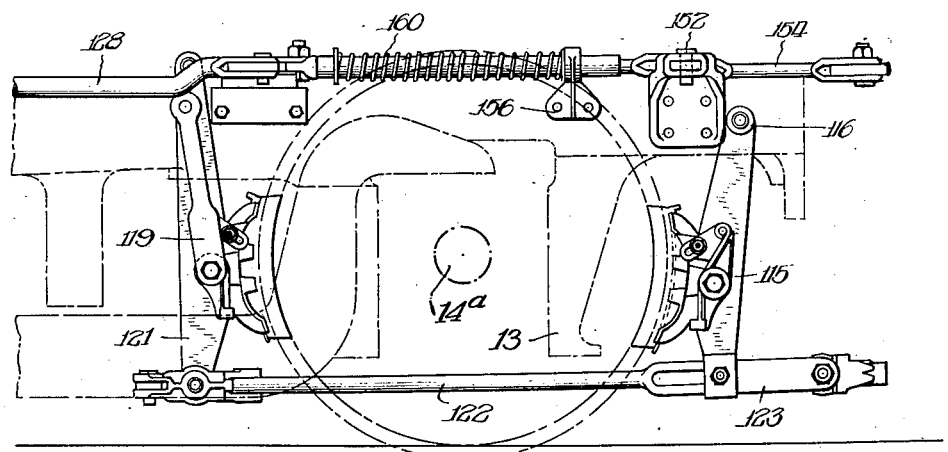

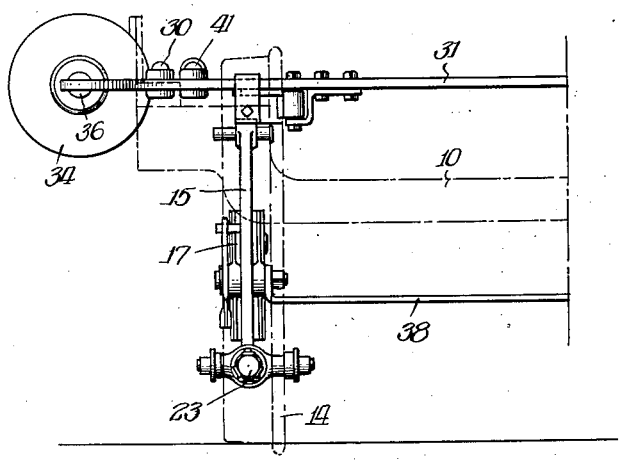
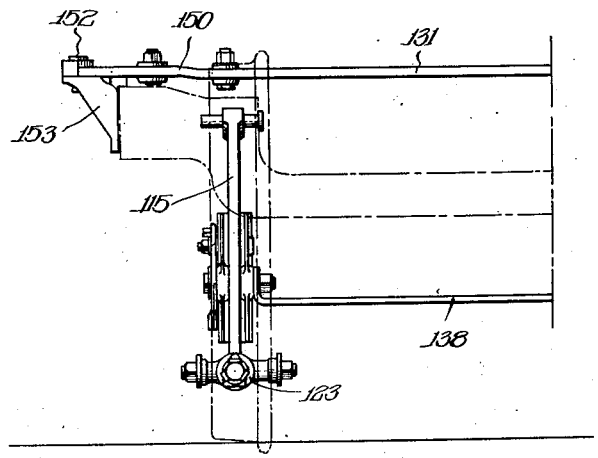

Patented Nov. 28, 1933

1,936,896

UNITED STATES PATENT OFFICE 1,936,896

BRAKE RIGGING

Walter H. Baselt, Chicago, Ill., assignor to American Steel Foundries, Chicago, Ill., a corporation of New Jersey Application January 31, 1930. Serial No. 424,806

19 Claims. (Cl. 188—56)

The invention relates to brake rigging for railway car trucks and has reference particularly to a beamless type of rigging, having associated therewith that type of brake in which a brake shoe is applied to opposite sides of a car wheel and known as a clasp brake.

One of the objects of the present invention is to provide a type of brake rigging especially adapted to meet service conditions prevailing in railway motor trucks, wherein it is necessary to provide sufficient space for parts attached to the underframe.

Yet another object is to provide a brake rigging in which the live truck levers are so connected to the truck and to the brake rigging that should certain links or connections fail, the levers will not fall on the tracks.

Still another object is to provide in a brake system of the type described, release mechanism which will allow efficient operation of the brakes but which will, after application of the brakes, serve to return the operating parts of the rigging to released position.

A still further object of the invention is to provide in a brake system as described, a release mechanism adapted to return the operative parts of the mechanism to release position, which will be spring actuated and of extreme simplicity in construction.

A yet further object is to provide a brake rigging of simple construction which will be light in weight and effective and positive in operation.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary plan view of a railway car truck equipped with brake rigging constructed in accordance with the present invention.

Figure 2 is a side elevation of the same.

Figure 3 is a fragmentary plan view of a modified form of brake rigging and release mechanism.

Figure 4 is a side elevation of the same.

Figure 5 is an end elevation of the arrangement shown in Figure 2, looking towards the left.

Figure 6 is an end elevation of the arrangement shown in Figure 4, looking towards the left.

Inasmuch as the opposite sides of the truck and brake herein disclosed are similar in construction, only one half is shown in the drawings and described with the belief that this will make for simplified explanation and a better understanding of the invention.

By referring to the drawings, particularly Figures 1 and 2, it will be noted that the present disclosure relates to a railroad car truck comprising a truck frame 10 of usual construction, having end members 11 and center member 12. The frame is provided with journal box supporting and guiding pedestals 13 for receiving in the usual manner journal boxes not shown, which have cooperative relation with the journal ends 14ª of the wheel and axle assemblies represented diagrammatically at 14.

The brake rigging proper comprises dead truck levers 15, which are pivoted to the frame at 16 and have pivotally connected intermediate their ends outside brake heads 17. The inside brake heads 18 located on the opposite side of the wheel are pivotally connected intermediate ends of levers 21 and pivotally supported from frame 10 by hangers 19, which hangers have pivotal connection to the frame by means of pins 20. The live truck levers 21 are thus pivotally connected to the brake heads 18 and hangers 19 which serve to pivotally support them from the frame. At the lower end of the dead truck levers 15 and the live truck levers 21 are pivotally secured the tie rods 22, located on both sides of the wheels and which have operatively secured to them a slack adjusting member 23. By means of this adjusting member the spacing of the lower end of the live and dead truck levers can be varied so that in operation the slack which develops from the wear on the brake shoes can be taken up.

Secured to the live truck levers are a plurality of horizontal levers, one of said levers comprising a live lever 24 and the other comprising a dead lever 25, each lever acting as an equalizing member. Both levers are connected to the live truck levers by means of a clevis connection 26, the dead lever being pivotally secured to the truck frame at substantially its mid-portion by means of a strap member 27. To the outer ends of the horizontal levers a tie rod 28 is connected for pivotally joining the same, the live lever 24 also having pivotally secured to it at substantially its mid-portion a pull rod 29. The pull rod is in turn pivotally connected at 30 to the outer end of an equalizing or radius bar 31. The equalizing bar 31 is supported for movement upon the truck frame by means of strap members 32 which members are in turn firmly secured by bolts or other means to the frame as at 33. For actuating the equalizing bar and thus the truck levers, pressure cylinders 34 are located on both sides of the frame and secured to the frame at 35. A piston rod 36 operatively associated with the pressure cylinder is secured to the extreme outer end of the equalizing bar at 37. To maintain the brake rigging rigid throughout its operative and inoperative positions, the dead truck levers 15 on both sides of the frame 10 are secured together by a connecting and spacing member 38. This member also serves to accurately space the brake heads 17 so as to keep the same in alinement with the tread on the car wheels. The clevis connection 26 not only serves to connect the horizontal levers to the live truck levers but should the hangers 19 fail the clevis will prevent the truck levers from falling upon the tracks.

For returning the brake rigging to inoperative position after application of the brakes, a release mechanism is provided, which comprises a release rod 40, extending longitudinally of the frame 10 and having pivotal securement at 41 to the equalizing bar 31. A collar 42 is secured to the frame and serves to position the rod 40 in place. At the outer end of the release rod is threaded a plurality of adjustable members 43, which secure on the rod a loose fitting collar 44. Mounted upon the rod 40 and located between the collar 44 and the collar 42 is a spring 45 which tends to force the release rod towards the left as viewed in Figure 1. A guiding member 46 is provided, being secured to the frame at 47 and has association with the free end of the release rod for guiding and maintaining the same in correct position.

Upon operation of the pressure cylinder 34 to apply the shoes to the car wheels, the piston rod 36 will be forced outward towards the right as viewed in Figure 1. As a pressure cylinder is located on both sides of the truck frame, the equalizing bar 31 will therefore be also forced towards the right. This movement will be transmitted to the horizontal levers 24 and 25 by the pull rod 29 and connecting rod 28, which movement will be transmitted to the live truck levers 21 through the clevis connection 26, thus applying the inside brake shoes to the car wheels. By means of the tie rods 22 the dead truck levers will also be actuated in a direction to apply the outside brake shoes also to the car wheels. Upon discontinuing the pressure the releasing means will come into operation and the release rod 40 will be forced by means of the spring 45 towards the left as viewed in Figure 1. This movement will serve to return the equalizing bar 31 into its released position thereby transmitting corresponding movement to the operative parts of the brake rigging, which will serve to return these parts to their inoperative position.

Referring to Figures 3 and 4 a modified form of brake rigging and release mechanism is disclosed in which modification the pressure cylinder is adapted to be secured to the underframe instead of being located on each side of the truck frame as above described. The same arrangement of live and dead truck levers designated 121 and 115 respectively, and connecting tie rods 122 is employed as in the arrangement described in connection with Figures 1 and 2. The dead truck lever is pivotally secured to the truck frame at 116 and the live truck lever is pivotally secured by means of the hanger 119.

Horizontal levers 124 are also employed, having connection to the live truck levers through clevis connections 126 and each being pivotally secured by means of connecting rods 128 to the remaining brake structure in a manner similar to that shown in Figure 1. In this modified form the live lever 124 is adapted to have secured to it at its mid-portion a pull rod 129. The mechanism for securing the free end of the pull rod 129 to the equalizing bar 131 comprises a fulcrum lever 150, which is connected to the pull rod at 151 and is pivotally secured to the truck frame at 152 by means of a bracket 153. A link 154 serves to secure the free end of the fulcrum lever to the end of the equalizing lever 131.

The above structure also embodies a modified form of release mechanism which includes a release rod 155, extending longitudinally of the frame and positioned on the frame so as to have movement relative thereto by means of a collar 156. The extreme left hand end as viewed in Figure 3 of the release rod has secured to it a connecting member 157 which serves to connect this end of the rod to the pull rod 129 as at 158. Attached to the rod is a spring 160 which is positioned on the rod so as to have bearing against the collar 156. In the operation of this modified form of brake arrangement movement of the equalizing lever will serve to impart movement to the pull rod 129 through means of the fulcrum lever 150. Corresponding movement is thus imparted to the remaining parts of the brake mechanism so as to apply the brakes to the car wheel. This movement however, is resisted by spring 160, which is correspondingly compressed so that upon release of the air pressure the spring 160 will exert a movement to the pull rod 129 in a direction to the left, which will thus serve to return the operative parts of the brake rigging to their released or inoperative position.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a truck frame including spaced side frames and end connecting members, said side frames having pedestals forming pedestal openings, pairs of wheel and axle assemblies the journal ends of which extend into the openings for cooperative relation with journal boxes disposed therein, brake rigging cooperating for braking relation with said wheels, said rigging including an equalizer bar disposed adjacent one end of said truck frame, brake cylinders disposed on the sides of said side frames adjacent said end of said truck frame and removed from the adjacent pedestal openings, the pistons of said cylinders operating in the direction of said end of said truck frame and being connected to the ends of said equalizer bar.

2. In a brake arrangement, the combination of a truck frame including spaced side frames and end connecting members, said side frames having pedestals forming pedestal openings, pairs of wheel and axle assemblies the journal ends of which extend into the openings for cooperative relation with journal boxes disposed therein, brake rigging cooperating for braking relation with said wheels, said rigging including an equalizer bar disposed adjacent one end of said truck frame, brake cylinders disposed on the sides of said side frames at substantially the level of the top of said side frames and adjacent said end of said truck frame and removed from the adjacent pedestal openings, the pistons of said cylinders operating in the direction of said end of said truck frame and being connected to the ends of said equalizer bar.

3. In a brake arrangement, the combination of a truck frame including spaced side frames and end connecting members, said side frames having pedestals forming pedestal openings, pairs of wheel and axle assemblies the journal ends of which extend into the openings for cooperative relation with journal boxes disposed therein, brake rigging cooperating for braking relation with said wheels, said rigging including an equalizer bar disposed adjacent one end of said truck frame, brake cylinders disposed on the sides of said side frames adjacent said end of said truck frame and removed from the adjacent pedestal openings, the pistons of said cylinders operating in the direction of said end of said truck frame and being connected to the ends of said equalizer bar, said ends being offset outwardly of said ends of said truck.

4. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite side of said wheels from said dead truck levers, a connection between each pair of dead and live truck levers, a dead lever pivoted to one of said live truck levers, a live lever pivoted to the other of said live truck levers, a connection between said dead and live levers, an equalizer bar disposed adjacent one end of said side frame and connected to said live lever, a cylinder disposed adjacent said end of said side frame and removed from the adjacent pedestal opening, said cylinder being operably connected to said equalizer bar and disposed substantially at the level of the top of said side frame.

5. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite side of said wheels from said dead truck levers, a connection between each pair of dead and live truck levers, a dead lever pivoted to one of said live truck levers, a live lever pivoted to the other of said live truck levers, a connection between said dead and live levers, an equalizer bar disposed adjacent one end of said side frame and connected to said live lever, a cylinder disposed adjacent said end of said side frame and removed from the adjacent pedestal opening, said cylinder being operably connected to said equalizer bar and disposed substantially at the level of the top of said side frame, and release mechanism connected to said equalizer bar and disposed between said equalizer bar and said live lever.

6. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame adjacent said end of said side frame and removed from the adjacent pedestal opening, the piston of said cylinder operating in the direction of said end of said side frame and being connected to the end of said equalizer bar.

7. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame, at substantially the level of the top of said side frame and adjacent said end of said side frame and removed from the adjacent pedestal opening, the piston of said cylinder operating in the direction of said end of said side frame and being connected to the end of said equalizer bar.

8. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame at substantially the level of the top of said side frame and adjacent said end of said side frame and removed from the adjacent pedestal opening, the piston of said cylinder operating in the direction of said end of said side frame and being connected to the end of said equalizer bar, and release mechanism connected to said equalizer bar and disposed adjacent said end of said side frame.

9. In a brake arrangement, the combination of a truck frame including spaced side frames and end connecting members, said side frames having pedestals forming pedestal openings, pairs of wheel and axle assemblies the journal ends of which extend into the openings for cooperative relation with journal boxes disposed therein, brake rigging cooperating for braking relation with said wheels, said rigging including an equalizer bar disposed adjacent one end of said truck frame, brake cylinders disposed on the sides of said side frames adjacent said end of said truck frame and removed from the adjacent pedestal openings, the pistons of said cylinders being connected to the ends of said equalizer bar.

10. In a brake arrangement, the combination of a truck frame including a side frame, said side frame having pedestals forming pedestal openings, pairs of wheel and axle assemblies, the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame adjacent said end of said side frame and removed from the adjacent pedestal opening, the piston of said cylinder being connected to the end of said equalizer bar.

11. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame adjacent said end of said side frame and removed from the adjacent pedestal opening, the piston of said cylinder being connected to the end of said equalizer bar, and release mechanism connected to said equalizer bar and disposed adjacent said end of said side frame.

12. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame adjacent said end of said side frame and removed from the adjacent pedestal opening, the piston of said cylinder operating in the direction of said end of said side frame and being connected to the end of said equalizer bar, said end of said equalizer bar being offset outwardly of the end of said side frame.

13. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame adjacent said end of said side frame and removed from the adjacent pedestal opening, the piston of said cylinder being connected to the end of said equalizer bar, said end of said equalizer bar being offset outwardly of the end of said side frame.

14. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including an equalizer bar disposed adjacent one end of said side frame, a brake cylinder disposed on the side of said side frame adjacent said end of said side frame and removed from the adjacent pedestal opening, the piston of said cylinder being connected to the end of said equalizer bar, said end of said equalizer bar being offset outwardly of the end of said side frame, and release mechanism connected to said equalizer bar inwardly of the offset end thereof.

15. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite side of said wheels from said dead truck levers, a connection between each pair of dead and live truck levers, a dead lever pivoted to one of said live truck levers, a live lever pivoted to the other of said live truck levers, a connection between said dead and live levers, an equalizer bar disposed adjacent one end of said side frame and connected to said live lever, a cylinder disposed adjacent said end of said side frame and removed from the adjacent pedestal opening, said cylinder being operably connected to said equalizer bar and disposed substantially at the level of the top of said side frame, the connection between said cylinder and equalizer bar being at an offset end of said bar.

16. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite sides of said wheels from said dead truck levers, a connection between each pair of dead and live truck levers disposed below the axles, a horizontally disposed dead lever pivoted adjacent the inner end thereof to one of said live truck levers and pivoted intermediate the ends thereof to said truck frame, a horizontally disposed live lever pivoted to the other of said live truck levers, a connection between the outer ends of said dead and live levers, an equalizer bar disposed adjacent one end of said side frames and connected to said live lever, a cylinder disposed adjacent said end of said side frame and removed from the adjacent pedestal opening, said cylinder being operably connected to said equalizer bar.

17. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite sides of said wheels from said dead truck levers, a connection between each pair of dead and live truck levers disposed below the axles, a horizontally disposed dead lever pivoted adjacent the inner end thereof to one of said live truck levers and pivoted intermediate the ends thereof to said truck frame, a horizontally disposed live lever pivoted to the other of said live truck levers, a connection between the outer ends of said dead and live levers, an equalizer bar disposed adjacent one end of said side frames and connected to said live lever, a cylinder disposed adjacent said end of said side frame and removed from the adjacent pedestal opening, said cylinder being operably connected to said equalizer bar, and disposed substantially at the level of the top of said side frame.

18. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite sides of said wheels from said dead truck levers, a connection between each pair of dead and live truck levers disposed below the axles, a horizontally disposed dead lever pivoted adjacent the inner end thereof to one of said live truck levers and pivoted intermediate the ends thereof to said truck frame, a horizontally disposed live lever pivoted to the other of said live truck levers, a connection between the outer ends of said dead and live levers, an equalizer bar disposed adjacent one end of said side frame and connected to said live lever, a cylinder disposed adjacent said end of said side frame and removed from the adjacent pedestal opening, said cylinder being operably connected to said equalizer bar, and disposed substantially at the level of the top of said side frame, the connection between said equalizer bar and said cylinder being at an offset end of said equalizer bar.

19. In a brake arrangement, the combination of a truck frame including a side frame, said side frame having pedestals forming pedestal openings, pairs of wheel and axle assemblies the journal ends of which extend into said openings for cooperative relation with journal boxes disposed therein, brake rigging cooperating for braking relation with said wheels, said rigging including a dead truck lever disposed adjacent the ends of said side frame and adjacent each wheel, a live truck lever disposed adjacent each wheel on the opposite sides of said wheels from said dead truck levers, a connection between each pair of dead and live truck levers disposed below the axles, a horizontally disposed dead lever pivoted adjacent the inner end thereof to one of said live truck levers and pivoted intermediate the ends thereof to said truck frame, a horizontally disposed live lever pivoted to the other of said live truck levers, a connection between the outer ends of said dead and live levers, an equalizer bar disposed adjacent one end of said side frame and connected to said live lever, a cylinder disposed adjacent said end of said side frame and removed from the adjacent pedestal opening, said cylinder being operably connected to said equalizer bar, and disposed substantially at the level of the top of said side frame, the connection between said equalizer bar and said cylinder being at an offset end of said equalizer bar, and release mechanism connected to said equalizer bar inwardly of the offset end thereof.

WALTER H. BASELT.